United States Patent
Zhang et al.

(10) Patent No.: US 7,865,653 B2
(45) Date of Patent: Jan. 4, 2011

(54) UNIVERSAL SERIAL BUS HOST CONTROLLER AND CONTROL METHODS THEREOF

(75) Inventors: Xin Zhang, Beijing (CN); Wenbin Li, Beijing (CN); Dejian Li, Beijing (CN)

(73) Assignee: Via Technologies, Inc., Hsin-Tien, Taipei (TW)

( * ) Notice: Subject to any disclaimer, the term of this patent is extended or adjusted under 35 U.S.C. 154(b) by 74 days.

(21) Appl. No.: 12/360,123

(22) Filed: Jan. 27, 2009

(65) Prior Publication Data

US 2009/0287871 A1 Nov. 19, 2009

(30) Foreign Application Priority Data

May 13, 2008 (CN) .......................... 2008 1 0099544

(51) Int. Cl.
*G06F 13/00* (2006.01)
(52) U.S. Cl. .................... 710/308; 710/22; 710/313
(58) Field of Classification Search .............. 710/22, 710/52, 56, 107, 313, 316
See application file for complete search history.

(56) References Cited

U.S. PATENT DOCUMENTS

| | | | |
|---|---|---|---|
| 6,957,356 B2* | 10/2005 | Leete | 713/502 |
| 2007/0143519 A1* | 6/2007 | Chang et al. | 710/305 |
| 2008/0005445 A1* | 1/2008 | Diefenbaugh et al. | 710/313 |
| 2009/0313397 A1* | 12/2009 | England et al. | 710/22 |

\* cited by examiner

*Primary Examiner*—Glenn A Auve
(74) *Attorney, Agent, or Firm*—Thomas, Kayden, Horstemeyer & Risley

(57) ABSTRACT

The present invention provides a USB host controller and control method thereof. The USB host controller comprises a first controller, a second controller and a first memory. The first controller controls first transfer between a host and a USB device. The second controller controls second transfer between the host and the USB device. The first memory is coupled to the first controller and the second controller and is configured to temporarily store data transferred between the host and the USB device. The first controller accesses the first memory during the first transfer, and the second controller accesses the first memory during the second transfer.

19 Claims, 4 Drawing Sheets

UNIVERSAL SERIAL BUS HOST CONTROLLER AND CONTROL METHODS THEREOF

CROSS REFERENCE TO RELATED APPLICATIONS

This application claims the benefit of China application Serial No. 200810099544.2 filed May 13, 2008, the subject matter of which is incorporated herein by reference.

BACKGROUND OF THE INVENTION

1. Field of the Invention

The invention relates to a Universal Serial Bus (USB) host controller and control method thereof, and more particularly to a USB host controller and control method thereof complied with the USB 2.0 standard for supporting periodic transfer and asynchronous transfer between the USB host controller and USB devices.

2. Description of the Related Art

Universal Serial Bus (USB) is a data communication standard developed by Intel and Microsoft for external buses. The main advantage is that the USB can support hot plug and plug & play functions. When a device is inserted, the host can enumerates the device and loads required driver programs automatically. Thus, USB is more convenient than Peripheral Component Interconnect (PCI) bus and Industry Standard Architecture (ISA) bus. USB standard is applied widely in different external device. For example, the USB can be used to connect computer mouses, keyboards, gamepads, joysticks, scanners, digital cameras, printers, hard discs, and network elements.

The USB has two common specifications: USB 1.1 and USB 2.0. For USB 1.1, the high speed transfer is 12 Mbps, while the low speed transfer is 1.5 Mbps. USB 2.0 is derived from USB 1.1. Its transfer speed may reach up to 480 Mbps (60 MB/s) and thus can satisfy speed requirements of most external devices. The enhanced host controller interface (EHCI) of USB 2.0 defines a structure compatible with USB 1.1, therefore the driver programs of USB 2.0 can drive devices of USB 1.1. In other words, all USB 1.1 supportive devices can be directly applied in USB 2.0 interface without concerning the issue of compatibility. Moreover, auxiliary elements, such as USB lines and plugs, can also be applied directly.

USB system is designed asymmetrically. It is composed by a USB host controller and several hub devices connected in tree architecture. The USB host controller is an important element responsible for physical data transfers between the USB host and the USB device. Pipes of data transmission between the USB host controller and USB devices can be classified into 4 types: control transfer, isochronous transfer, interrupt transfer, and bulk transfer. The control transfer is usually utilized in short and simple responses to commands and/or status of devices, such as pipe 0 used for bus control. The pipe 0 is a requisite pipe of USB system and is used to control USB devices on the bus. The isochronous transfer provides continuous data transfer (possibly but may not be provided at high speeds), such as real-time audio and video data. But isochronous transfer may suffer the problem of data loss. Interrupt transfer is applied for USB devices that must be responded as soon as possible (only allowing for limited delay), such as computer mouses and keyboards. Bulk transfer utilizes unused bandwidth for transferring large data (without guarantee of delay, continuity, bandwidth, and/or speed), such as common file transfers. Based on the features of the four transfers, the isochronous transfer and the interrupt transfer are generally referred to periodic transfers, while the control transfer and the bulk transfer are generally referred to asynchronous transfers.

USB host controller is the core element of a USB host and comprises five hub stages at most. The USB host controller can connect up to 127 USB devices, including each hub stage. Since USB is widely applied, designing USB host controller with low cost and high efficiency is an important issue in USB system design.

BRIEF SUMMARY OF THE INVENTION

In an embodiment, the present invention provides a universal serial bus (USB) host controller, which comprises a first controller, a second controller, and a first memory. The first controller controls first transfer between a host and a USB device. The second controller controls second transfer between the host and the USB device. The first memory is coupled to the first controller and the second controller and is configured to temporarily store data transferred between the host and the USB device. The first controller accesses the first memory during the first transfer process, and the second controller accesses the first memory during the second transfer process.

In another embodiment of the present invention discloses a control method applied to a universal serial bus (USB) host controller. The control method comprises: accessing a first memory through a first controller to perform a first transfer between the USB host controller and a USB device in a first transfer stage; and accessing the first memory through a second controller to perform a second transfer between the USB host controller and the USB device in a second transfer stage. The first controller and the second controller access the first memory through a first direct memory access (DMA) engine.

In some embodiments, the first transfer is a periodic transfer, the first controller is a periodic controller, the second transfer is an asynchronous transfer, the second controller is an asynchronous controller, and the priority of the first transfer is higher than the priority of the second transfer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
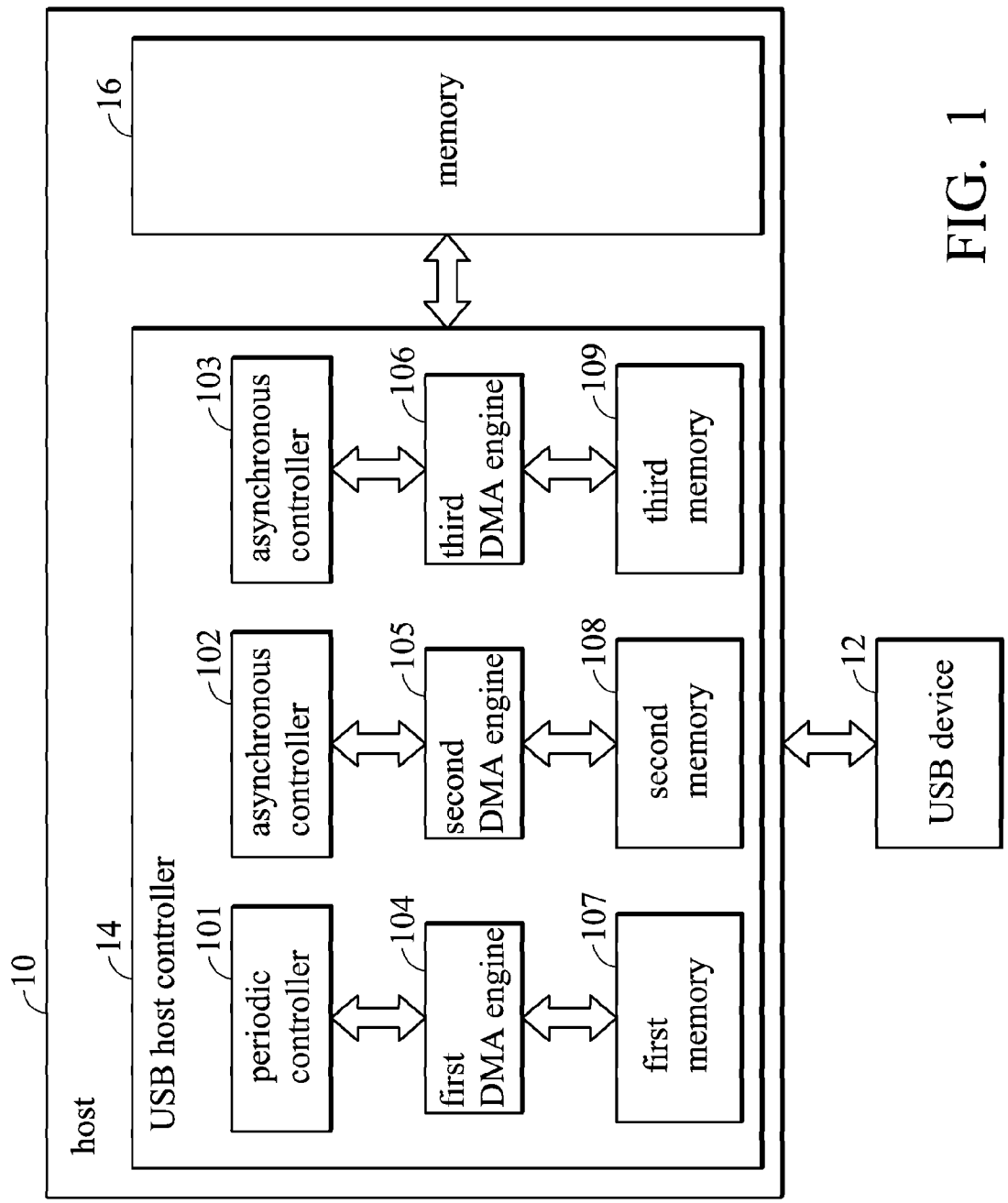
FIG. 1 is a schematic view showing an exemplary embodiment of a USB host controller.

In an embodiment of a Universal Serial Bus (USB) host controller applied in a host in FIG. 1, a USB host controller 14 is disposed inside a host 10 and coupled to a memory 16. A USB device 12 is coupled to the USB host controller 14 via a USB hub. When the USB device 12 is coupled to the USB host controller 14, the USB host controller 14 assigns a unique 7-bit address to the USB device 12 to identify the USB device 12. The USB host controller 14 distributes data flow by voting, for example in a polling fashion. Thus, before the USB device 12 explicitly sends a request to the USB host controller 14, the USB device 12 can not transfer data. Note that the transfer described therein refers to bi-directional transfer. That is, data transfer from the USB device 12 to the USB host controller 14 or from the USB host controller 14 to the USB device 12. When the transfer pipe is built, the USB host controller 14 can control transfer of any type of data from the USB device 12 to the USB host controller 14 or from the USB host controller 14 to the USB device 12.

According to the two different transfer types (periodic transfer and asynchronous transfer) as previously described, USB host controller 14 is configured with one or more periodic controllers and asynchronous controllers. In an embodiment of the present invention, the USB host controller 14 comprises a periodic controller 101 and two asynchronous controllers 102 and 103 for controlling periodic transfer and asynchronous transfer between the USB device 12 and the USB host controller 14, as shown in FIG. 1. Correspondingly, the USB host controller 14 comprises three memories: a first memory 107, a second memory 108, and a third memory 109, for temporarily storing data transferred between the USB device 12 and the USB host controller 14. When the USB host controller 14 performs periodic transfer, the periodic controller 101 accesses the first memory 107 through a first direct memory access (DMA) engine 104. When the USB host controller 14 performs asynchronous transfer, the asynchronous controllers 102 and 103 access the second memory 108 and the third memory 109 through a second DMA engine 105 and a third DMA engine 106, respectively.

The first memory 107, the second memory 108, and the third memory 109 can be implemented by static random access memories (SDRAMs) or other suitable memory devices. Moreover, since transfer speed of USB devices has been increased drastically (speed of high-speed USB devices has reached 480 Mbps), capacity of memories has to be properly designed. If the capacity of memories is designed too large, resources are wasted. If the capacity of memories is designed too small, data errors may occurs due to memory over-run or under-run. Thus, in the embodiment, capacity of the memories is designed according to the maximum size of the transferred data packets. For example, the capacity of the first memory 107 is designed as the maximum size of the transferred data packets in the periodic transfer, which is 256×32 bits (1024 bytes). The capacity of the second and third memories 108 and 109 is designed as the maximum size of the transferred data packets in the asynchronous transfer, which is 128×32 bits (512 bytes).

The USB host controller 14 can suitably support any type of data transfer between high-speed USB devices and a host controller, and avoid over-run or under-run of memories within the host controller.

Figure 2:
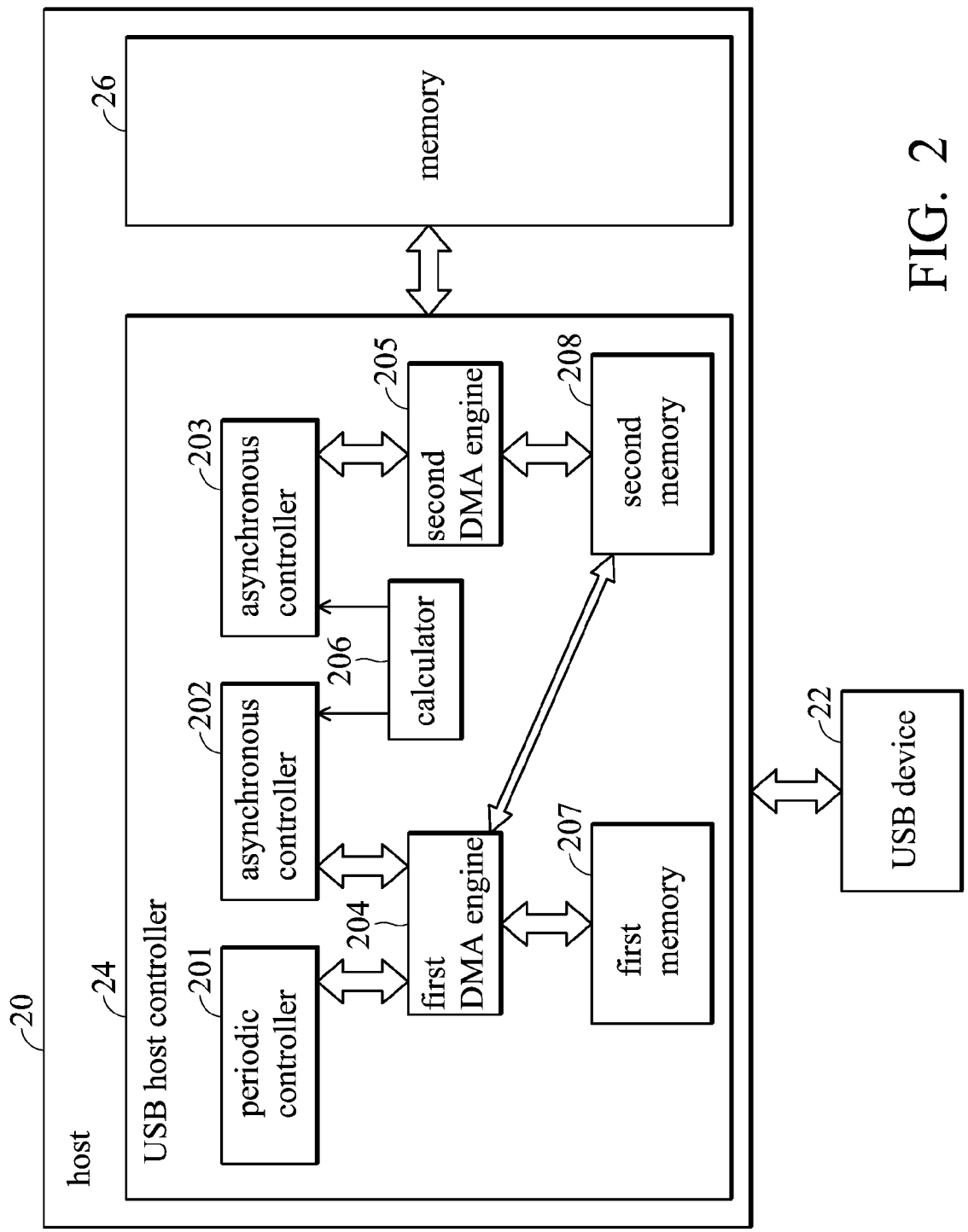
FIG. 2 is a schematic view showing another exemplary embodiment of a USB host controller.

FIG. 2 is a schematic view showing an exemplary embodiment of a USB host controller. Referring to FIG. 2, a USB host controller 24 is disposed in a host 20 and coupled to a memory 26. A USB device 22 is coupled to the USB host controller 24 through a USB hub (not shown in FIG. 2). The USB host controller 24 comprises a periodic controller 201 and two asynchronous controllers 202 and 203 for controlling periodic transfer and asynchronous transfer between the USB device 22 and the USB host controller 24. Although here illustrates a USB host controller configured with three controllers, however, the amount of controllers is not limited to this embodiment. The present invention can be applied in a USB host controller which comprises more or less controllers or other types of controllers.

The difference between the USB host controller 24 of FIG. 2 and the USB host controller 14 of FIG. 1 is that, the USB host controller 24 of FIG. 2 comprises two memories (a first memory 207 and a second memory 208), and a corresponding first DMA engine 204 and second DMA engine 205. Data transfer between the USB device 22 and the USB host controller 24 is usually transmitted in micro-frames, each frame is 125 ns according to the embodiment. During the transfer cycle of a micro-frame, the priority of the periodic transfer is higher than the priority of the asynchronous transfer. Thus, in the embodiment, transfer of each micro-frame is divided into two stages, periodic transfer stage and asynchronous transfer stage. The USB host controller 24 only performs periodic transfer in the periodic transfer stage, while the USB host controller 24 only performs asynchronous transfer in the asynchronous transfer stage.

Figure 3:
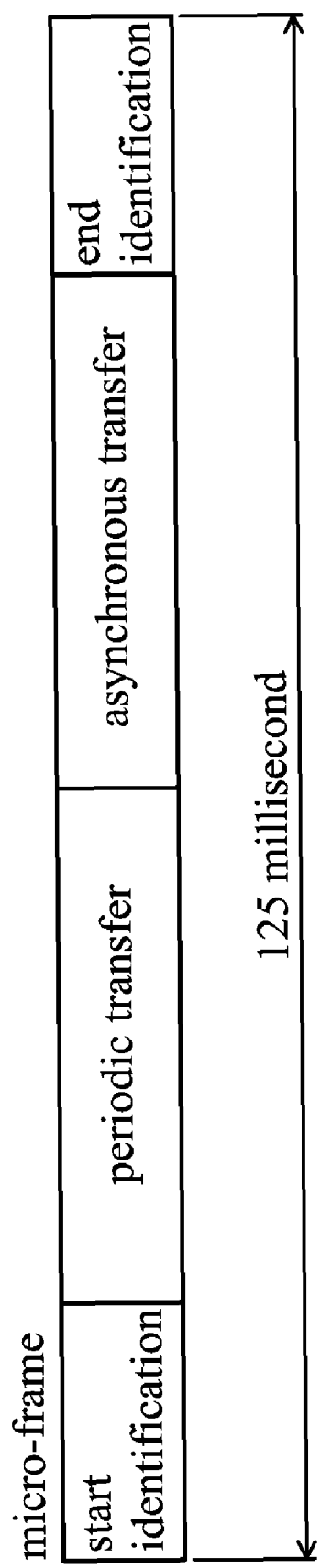
FIG. 3 shows format of a micro-frame to be transferred between a USB host controller and a USB device.

FIG. 3 shows format of data micro-frame to be transferred between the USB host controller 24 and the USB device 22. As shown in FIG. 3, the time period of each micro-frame is equal to 125 ns, which is marked by a start indicator and an end indicator. During the transfer period, the periodic transfer is performed first then the asynchronous transfer is performed next. In the embodiment, the time period of each micro-frame can be set to other values, not limited to 125 ns.

Operation of the data transfer according to an embodiment of the present invention will be described in the following. In the periodic transfer stage, the periodic controller 201 within the USB host controller 24 accesses the first memory 207 and the second memory 208 through the first DMA engine 204. When the periodic controller 201 accesses the first memory 207 to a predetermined amount of data, such as the first memory 207 is full or empty, the periodic controller 201 controls an internal address pointer directing to the second memory 208. In this way the periodic controller 201 may continue to access the second memory 208 through the first DMA engine 204. Therefore, the memory capacity that can be accessed by the periodic controller 201 is equal to the sum of the capacity of the first memory 207 and the second memory 208. Afterward, in the asynchronous transfer stage of the same micro-frame, the asynchronous controllers 202 and 203 within the USB host controller 24 accesses the first memory 207 through the first DMA engine 204, and the asynchronous controllers 203 within the USB host controller 24 accesses the second memory 208 through the second DMA engine 205. Thus, the memory capacity that can be accessed by the asynchronous controllers 202 and 203 is equal to the capacity of the first memory 207, and the memory capacity that can be accessed by the asynchronous controllers 203 is equal to the capacity of the second memory 208.

It should be noted that, after the periodical transfer is completed and before the asynchronous transfer starts transferring asynchronous data packet, the USB host controller 24 would calculate the remaining time of the micro-frame by an internal counter 206 in order to determine whether the time left for the micro-frame is sufficient to transfer a complete asynchronous data packet or not. If the USB host controller 24 determines that the remaining time of the micro-frame is sufficient to transfer a completer asynchronous data packet, the asynchronous controller 202 or 203 controls the transfer of the asynchronous data packet. If the USB host controller 24 determines that the remaining time of the micro-frame is not sufficient enough to transfer a complete asynchronous data packet, the asynchronous controller 202 or 203 stops the asynchronous transfer.

In an embodiment of the present invention, the first memory 207 and the second memory 208 can be implemented by static random access memories (SDRAMs). In order to avoid memory over-run or under-run, the capacity of the memories is designed based on the maximum size of the transferred data packets. In an embodiment of the present invention, the sum of the capacity of the first memory 207 and the second memory 208 is equal to or greater than the maximum size of the data packets in periodic transfer, while the capacity of the first memory 207 and the second memory 208 is equal to or greater than the maximum size of the data packets in asynchronous transfer each. If the maximum size of the data packets in periodic transfer is 1024 bytes and the maximum size of the data packets in asynchronous transfer is 512 bytes, for example, both the capacity of the first memory 207 and the second memory 208 can be set to 128×32 bits. As a result, the sum of the capacity of the first memory 207 and the second memory 208 is equal to 1024 bytes that satisfies both needs of periodic transfer and asynchronous transfer. Without departing from the spirit of the present invention, the capacity of the memories can be designed with other combinations.

Although the memories are implemented by SDRAMs as described above. However, the present invention is not limited to such embodiments. Other readable/writable memories, such as flash memory, can be used as memories within the USB host controller of the present invention. Moreover, the memories can be integrated on a single chip or separated on two chips. The memories can be configured in various ways. For example, one memory may be divided into two portions, each portion supports one of the transfers respectively.

Accordingly, the area of the USB host controller 24 of FIG. 2 is smaller than the area of the USB host controller 14 of FIG. 1 by at least one third. Moreover, the number of DMA engines of the USB host controller 24 of FIG. 2 is less than the number of DMA engines of the USB host controller 14 of FIG. 1 by one. Therefore, memory size and number of DMA engines required can be reduced by sharing memories and DMA engines during the two stage transfer of periodic transfer and asynchronous transfer on the basis of avoiding memory over-run or under-run. As a result minimizes the overall circuit area of the USB host controller.

For further enhancing the performance of the USB host controller 24, the USB host controller 24 performs a pre-fetch operation at the end of periodic transfer, which will be described in the following. In the periodic transfer stage, when the periodic controller 201 controls the last data packet of the periodic transfer, the USB host controller 24 detects the storage status of the first memory 207 and the second memory 208. If one of the first memory 207 and the second memory 208 is empty or has remaining data less than a predetermined quantity, the USB host controller 24 performs a pre-fetch operation. That is, the USB host controller 24 fetches one or more asynchronous data packets from the memory 26 in advance and stores the fetched data packet(s) into the memory which is empty or has remaining data less than the predetermined quantity. Consequently in the following asynchronous transfer stage, if the asynchronous transfer from the USB host controller 24 to the USB device 22 is determined to take place, data packets to be transferred at the beginning or next need not be fetched from memory 26 in asynchronous transfer. Instead, data packets pre-fetched and stored in the memory can be transmitted to the USB device 22 directly, thereby improves performance efficiency.

Figure 4:
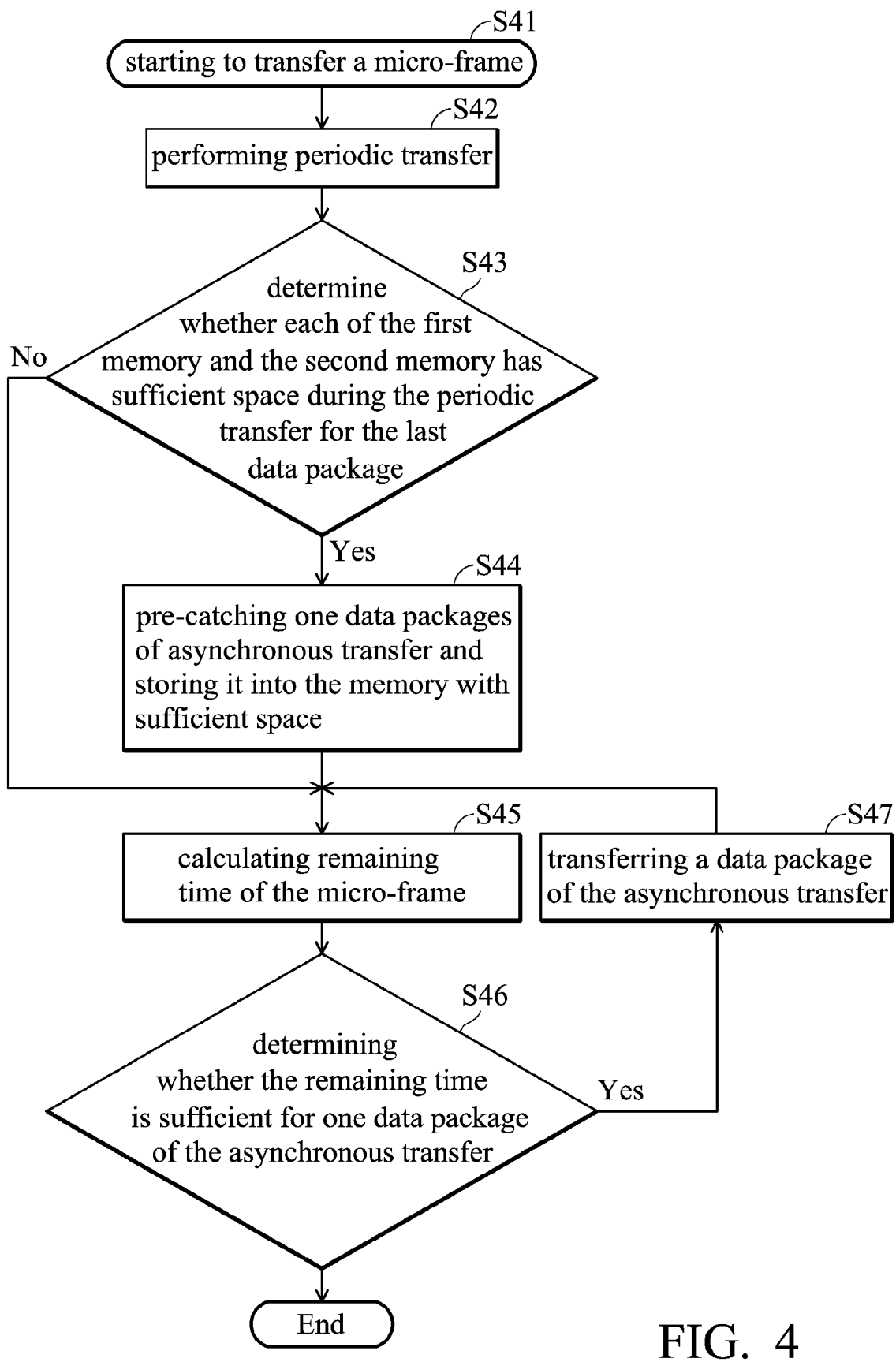
FIG. 4 is flow chart of a control method applied to a USB host controller.

FIG. 4 is flow chart of a control method for the USB host controller 24 of FIG. 2 for describing the detailed operation of the USB host controller 24. First, at step S41, the USB host controller 24 starts transfer of a micro-frame. At step S42, USB host controller 24 performs a first transfer through the periodic controller 201. For example, the periodic controller 201 performs periodic transfer with access to the first memory 207 or the second memory 208. At the step S43, while transferring the last data packet in periodic transfer, the USB host controller 24 detects the storage status of the first memory 207 and the second memory 208 to determine whether each of the first memory 207 and the second memory 208 has sufficient space. For example, the remaining unused space of the first memory 207 and/or the second memory 208 is greater than a predetermined size, or one of the first memory 207 and the second memory 208 is empty. If one of the conditions is met, for example the first memory 207 or the second memory 208 has unused space greater than the predetermined size, the process goes to step S44. At step S44, the USB host controller 24 performs a pre-fetch operation to fetch one or more data packets of the second transfer from the memory to the first memory 207 or the second memory 208 that has sufficient available space. On the other hand, if none of the conditions is met, the process completes the periodic transfer and jumps to step S45 entering the second transfer stage. For example, asynchronous transfer of the second memory 208. At step S45, the USB host controller 24 calculates remaining time of the micro-frame by an internal counter 206. At the step S46, the USB host controller 24 determines whether the remaining time is sufficient to transfer a complete asynchronous data packet. If yes, the asynchronous controller 202 or 203 starts transferring of the data packet in step S47. If the USB host controller 24 determines that the remaining time of the micro-frame is not sufficient to transfer the asynchronous data packet, the asynchronous controller 202 or 203 stops performing the asynchronous transfer, and the flow of the micro-frame terminates. Thus, in the asynchronous transfer stage, before transfer of each asynchronous data packet, the USB host controller 24 calculates the remaining time of the micro-frame in order to make sure the asynchronous data packet can be transferred in complete. When the remaining time of the micro-frame is sufficient to transfer the next asynchronous data packet, transfer of that data packet is performed. Steps S45-S47 are repeated until the remaining time of the micro-frame is not sufficient to perform a complete transfer.

The host in the present invention can be a computer or other portable devices. The USB host controller can be a host controller complied with EHCI specification. The USB host controller may comprise any number of periodic controllers and asynchronous controller, not limited to the embodiments described above. USB host controllers configured with more number of controllers than the embodiments of the present invention can still benefit from the concept and spirit of the present invention and the advantage of reducing circuit area.

In addition, embodiments of the present invention can be applied in other types of transfer devices and is not limited to USB host controllers.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A universal serial bus (USB) host controller, comprising:
   a first controller, configured to control a first transfer between a host and a USB device;
   a second controller, configured to control a second transfer between the host and the USB device;
   a first memory, coupled to the first controller and the second controller and configured to temporarily store data transferred between the host and the USB device; and a first direct memory access (DMA) engine, wherein the first controller and the second controller access the first memory through the first DMA engine, wherein the first controller accesses the first memory during the first transfer, and the second controller accesses the first memory during the second transfer.

2. The USB host controller as claimed in claim 1 further comprising a second memory, wherein the first controller accesses the second memory during the first transfer.

3. The USB host controller as claimed in claim 2 further comprising a first direct memory access (DMA) engine, wherein the first controller accesses the first memory and the second memory through the first DMA engine during the first transfer, and the second controller accesses the first memory through the first DMA engine during the second transfer.

4. The USB host controller as claimed in claim 2 further comprising:
a third controller, configured to access the second memory during the second transfer; and
a second DMA engine,
wherein the third controller accesses the second memory through the second DMA engine during the second transfer.

5. The USB host controller as claimed in claim 2, wherein during the first transfer, in response to the first controller accesses a predetermined amount of data or the first memory is full or empty, the first controller controls an address pointer to direct to the second memory for accessing the second memory in consequent.

6. The USB host controller as claimed in claim 2, wherein during the first transfer, while the first controller transfers a last data packet of the first transfer, in response to one of the first memory and the second memory is empty or has a predetermined size of unused space, the USB host controller performs a pre-fetch operation to pre-fetch one or more data packets of the second transfer from the host in advance and stores the one or more pre-fetched data packets into the first memory or the second memory which is empty or has the predetermined size of unused space.

7. The USB host controller as claimed in claim 2, wherein the sum of the capacity of the first memory and the second memory is equal to or greater than a maximum size of data packets in the first transfer, while the capacity of each of the first memory and the second memory is equal to or greater than a maximum size of data packets in the second transfer.

8. The USB host controller as claimed in claim 1 further comprising a counter, wherein data transfer between the USB device and the USB host controller is performed by micro-frames, and for each of the micro-frames, the first controller performs the first transfer first, and then the second controller performs the second transfer.

9. The USB host controller as claimed in claim 8, wherein the counter calculates remaining time of a micro-frame transfer before performing the second transfer in order to determine whether the remaining time is sufficient to completely transfer a data packet of the second transfer;
wherein in response to the remaining time is sufficient to transfer the data packet, the second controller transfers the data packet; and
wherein in response to the remaining time is not sufficient to transfer the data packet, the second controller stops the second transfer.

10. The USB host controller as claimed in claim 1, wherein the first transfer is a periodic transfer, the first controller is a periodic controller, the second transfer is an asynchronous transfer, the second controller is an asynchronous controller, and the priority of the first transfer is higher than the priority of the second transfer.

11. A control method applied to a universal serial bus (USB) host controller, comprising:
accessing a first memory through a first controller to perform a first transfer between the USB host controller and a USB device in a first transfer stage; and
accessing the first memory through a second controller to perform a second transfer between the USB host controller and the USB device in a second transfer stage;
wherein the first controller and the second controller access the first memory through a first direct memory access (DMA) engine.

12. The control method as claimed in claim 11, wherein data transfer between the USB device and the USB host controller is performed by micro-frames, and for each of the micro-frames, the first controller performs the first transfer first, and then the second controller performs the second transfer.

13. The control method as claimed in claim 12 further comprising calculating remaining time of a micro-frame transfer before performing the second transfer in order to determine whether the remaining time is sufficient to completely transfer a data packet of the second transfer.

14. The control method as claimed in claim 13 further comprising:
in response to the remaining is sufficient to completely transfer the data packet, the second controller performs transfer of the data packet; and
in response to the remaining time is not sufficient to completely transfer a data packet, the second controller stops the second transfer.

15. The control method as claimed in claim 11 further comprising accessing a second memory by the first controller through the first DMA engine during the first transfer.

16. The control method as claimed in claim 15 further comprising accessing the second memory by a third controller through a second DMA engine during the second transfer.

17. The control method as claimed in claim 15, wherein the step of accessing in the first transfer stage further comprises controlling an address pointer of the first controller to direct to the second memory for accessing the second memory in consequent by the first controller in response to the accessing of the first memory reaches a predetermined amount of data.

18. The control method as claimed in claim 15, wherein the step of the accessing in the first transfer stage further comprises in response to one of the first memory or the second memory has unused space more than a predetermined size, performing a pre-fetch operation to pre-fetch one or more data packets from a host and store the pre-fetched data packets in the first memory or the second memory which has unused space more than the predetermined size in the first transfer stage.

19. The control method as claimed in claim 11 wherein the first transfer is a periodic transfer, the first controller is a periodic controller, the second transfer is an asynchronous transfer, the second controller is an asynchronous controller, and the priority of the first transfer is higher than the priority of the second transfer.

* * * * *